United States Patent
Jaiswal

(10) Patent No.: US 9,137,317 B2
(45) Date of Patent: *Sep. 15, 2015

(54) DATA LOSS PREVENTION OF INFORMATION USING STRUCTURED DOCUMENT TEMPLATES AND FORMS

(71) Applicant: Symantec Corporation, Mountain View, CA (US)

(72) Inventor: Sumesh Jaiswal, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,925

(22) Filed: Nov. 24, 2014

(65) Prior Publication Data

US 2015/0143518 A1 May 21, 2015

Related U.S. Application Data

(63) Continuation of application No. 13/365,897, filed on Feb. 3, 2012, now Pat. No. 8,898,779.

(51) Int. Cl.
*H04L 29/06* (2006.01)
*H04L 29/08* (2006.01)
*G06F 21/60* (2013.01)

(52) U.S. Cl.
CPC .............. *H04L 67/20* (2013.01); *G06F 21/60* (2013.01); *H04L 63/1408* (2013.01)

(58) Field of Classification Search
CPC ..... G06F 21/60; G06F 21/00; H04L 63/1408; H04L 67/20
See application file for complete search history.

(56) References Cited

U.S. PATENT DOCUMENTS

| 7,996,374 | B1 | 8/2011 | Jones et al. |
| 8,499,359 | B1 * | 7/2013 | Blanke ............................ 726/32 |
| 8,544,060 | B1 * | 9/2013 | Khetawat ........................ 726/1 |
| 8,935,752 | B1 * | 1/2015 | Chen et al. ....................... 726/4 |
| 2010/0162347 | A1 | 6/2010 | Barile |
| 2010/0254615 | A1 | 10/2010 | Kantor et al. |
| 2012/0291087 | A1 * | 11/2012 | Agrawal .......................... 726/1 |
| 2012/0303558 | A1 | 11/2012 | Jaiswal |
| 2013/0139260 | A1 | 5/2013 | McDougal |
| 2014/0020045 | A1 * | 1/2014 | Kabat et al. ..................... 726/1 |

OTHER PUBLICATIONS

Check Point Software Technologies Ltd. (2010). "DLP Software Blade," 4 pages.
USPTO; Office Action for U.S. Appl. No. 13/365,897 mailed Feb. 25, 2014.
USPTO; Notice of Allowance for Application U.S. Appl. No. 13/365,897 mailed Jul. 25, 2014.

* cited by examiner

*Primary Examiner* — Chau Le
(74) *Attorney, Agent, or Firm* — Lowenstein Sandler LLP

(57) ABSTRACT

A method and apparatus for identifying information as protected information using a structure is described. A DLP system, incorporating a structure analyzer, monitors outbound data transfers performed by the computing system for violations of a DLP policy. The DLP system analyzes a structure of information contained in an outbound data transfer against a protected structure defined in a DLP policy. The DLP system identifies the information as protected information to be protected by the DLP policy based on the analysis, and, when the information is identified as protected, the DLP system detects a violation of the DLP policy. The protected structure may be derived from document templates, document forms, or from a set of training documents.

20 Claims, 4 Drawing Sheets

DATA LOSS PREVENTION OF INFORMATION USING STRUCTURED DOCUMENT TEMPLATES AND FORMS

CROSS-REFERENCE TO RELATED APPLICATIONS

This application is a continuation of U.S. application Ser. No. 13/365,897, filed Feb. 3, 2012, and entitled "Data Loss Prevention of Information Using Structured Document Templates and Forms," which is incorporated herein by reference.

TECHNICAL FIELD

Embodiments of the invention relate to the field of processing data, and more particularly, to data loss prevention using structured document templates and forms.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations invest significant efforts in installing DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices and should be accessible to certain users who are authorized for the purpose. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

Conventional DLP systems typically use three methods to detect sensitive information in unstructured data (such as documents): 1) described content matching (e.g. regular expressions, keyword dictionaries); 2) content fingerprinting; and 3) machine-learning based content classification. These methods are effective when the information to be protected is exactly known, or can be described exactly using regular expressions and/or keyword dictionaries. Similar content has been used for training the machine-learning based classifier. These methods lose their effectiveness the moment there is new information which is sensitive but is not known to the DLP system a-priori. For example, in a software development firm new design documents are created frequently, and most of the time the content to be protected is completely new to the DLP system, which then is not able to identify the protected content. The methods described above do not perform a blanket identification of such design documents so that they may be protected from data loss. Similarly, pay statements are generated for each employee every month but they are all unique and unknown to the DLP systems. Currently such information is protected using described content matching techniques (e.g. regular expressions, keyword dictionaries) but their effectiveness is limited and they have a high rate of false positives.

SUMMARY

A method and apparatus for identifying information as protected information using the structure of the information is described. In one exemplary embodiment of a method, a DLP system, which incorporates a structure analyzer as described herein, monitors outbound data transfers performed by the computing system for violations of a DLP policy. The DLP system analyzes a structure of information contained in an outbound data transfer against a protected structure defined in a DLP policy. The protected structure may be based on one or more other protected documents. The information being monitored may not be specifically identified in the DLP policy and the DLP system can protect the information without a priori knowledge of the particular information. The DLP system identifies the information as protected information to be protected by the DLP policy based on the analysis, and, when the information is identified as protected, the DLP system detects a violation of the DLP policy. The protected structure may be derived from underlying templates of documents, document forms, or from a set of training documents.

In yet another embodiment, the DLP system defines the protected structure using at least one of a document template, a document form, or a preformatted file type. In another embodiment, the DLP system performs a training phase to define the protected structure. In one embodiment of the training phase, the DLP system receives input that identifies a template file. The DLP system extracts first structural information from the template file, and defines the protected structure based on the first structural information from the template file. In another embodiment, the DLP system extracts one or more properties from the template file and one or more building blocks from the template file. In yet a further embodiment, DLP system, which may reside on a different machine or on the same machine as the DLP system that performs the training phase, performs a detection phase to identify the information contained in the outbound data transfer as protected information. In one embodiment of the detection phase, the DLP system extracts second structural information from the information contained in the outbound data transfer, and compares the second structural information against the protected structure defined in the training phase. In another embodiment, the training phase can be performed on the client computing system as would be appreciated by one of ordinary skill in the art having the benefit of this disclosure.

In another embodiment of the training phase, the DLP system receives input that identifies a blank form. The DLP system extracts first structural information from the blank form, and defines the protected structure based on the first structural information from the blank form. In one embodiment, the DLP system extracts multiple structural elements from the blank form and creates a list of multiple structural elements. The structural elements may be formatted text elements, graphical elements, tables, embedded objects, or the like. In yet a further embodiment, DLP system (on same or different machine) performs a detection phase that extracts second structural information from the information contained in the outbound data transfer, and compares the second structural information against the protected structure defined in the training phase.

In one embodiment, the blank form is a spreadsheet, and the DLP system extracts multiple structural elements from multiple cells of the spreadsheet. The DLP system creates a 2D array to define the protected structure. During the detection phase, the DLP system extracts second structural information from the information contained in the outbound data transfer, and compares the second structural information against the 2D array defined in the training phase. In another embodiment, the blank form is a standard form, such as a wiki template page, a standard regulatory form such as an Income Tax Return form, and other documents that contain only the structural elements of the final document and are otherwise 'empty'. Alternatively, the blank forms may be other types of documents as would be appreciated by one of ordinary skill in the art having the benefit of this disclosure.

In another embodiment of the training phase, the DLP system receives input that identifies a set of training documents which are based on a common structure. The DLP system extracts first structural information from the set of training documents, and defines the protected structure information based on the first structural information from the set of training documents. In one embodiment, for each of the training documents, the DLP system extracts multiple structural elements (e.g., formatted text elements, graphical elements, tables, embedded objects, or the like), creates a list from the plurality of structural elements for each of the set of training documents, and determines common structure elements from the created lists for the second structural information. In one embodiment, an n-way difference operation may be performed to determine the common structure elements. Alternatively, other operations may be used to determine the common structure elements as would be appreciated by one of ordinary skill in the art having the benefit of this disclosure. The DLP system uses the common structure elements to define the protected structure. In yet a further embodiment, DLP system (on same or different machine) performs a detection phase that extracts second structural information from the information contained in the outbound data transfer, and compares the second structural information against the protected structure defined in the training phase.

In one embodiment, the set of training documents are spreadsheets, and the DLP system extracts multiple structural elements from multiple cells of the spreadsheet. The DLP system creates a 2D array to define the protected structure. During the detection phase, the DLP system extracts second structural information from the information contained in the outbound data transfer, and compares the second structural information against the 2D array defined in the training phase. Alternatively, the training documents may be other types of documents as would be appreciated by one of ordinary skill in the art having the benefit of this disclosure.

In addition, a computer readable storage medium for identifying information as protected information is described. An exemplary computer readable storage medium provides instructions, which when executed on a processing system causes the processing system to perform a method such as the exemplary methods discussed above.

Further, systems and apparatus performing a structure analyzer in a file system are described. An exemplary apparatus may include a memory and a processor coupled to the memory. The processor is configured to execute the structure analyzer to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for identifying information as protected information using a structure is described. In one exemplary embodiment of a method, a DLP system, which incorporates a structure analyzer as described herein, monitors outbound data transfers performed by the computing system for violations of a DLP policy. The DLP system analyzes a structure of information contained in an outbound data transfer against a protected structure defined in a DLP policy. The protected structure may be based on one or more other protected documents. The information being monitored may not be specifically identified in the DLP policy and the DLP system can protect the information without a priori knowledge of the particular information. The DLP system identifies the information as protected information to be protected by the DLP policy based on the analysis, and, when the information is identified as protected, the DLP system detects a violation of the DLP policy. The protected structure may be derived from templates of documents, document forms, or from a set of training documents.

The embodiments described herein provide a method and apparatus to detect the sensitive nature of a document by analyzing its underlying structure, template or form upon which it is based. Since the embodiments described herein do not make violation decisions on the basis of sensitive content within the document, the embodiments continue to be effective even if the sensitive content is partially or completely new to the DLP system. In one embodiment, the DLP product uses a structure analyzer to analyze the structure of the information being transferred against the structure of one or more templates or forms. When the structure matches, the structure analyzer can indicate that the information should be protected and can be used to detect a violation. When there is a violation, the DLP produce can perform one or more remedial or preventive actions in connection with the detection of the violation.

In the following description, numerous details are set forth. It will be apparent, however, to one of ordinary skill in the art having the benefit of this disclosure, that embodiments of the present invention may be practiced without these specific details.

Figure 1:
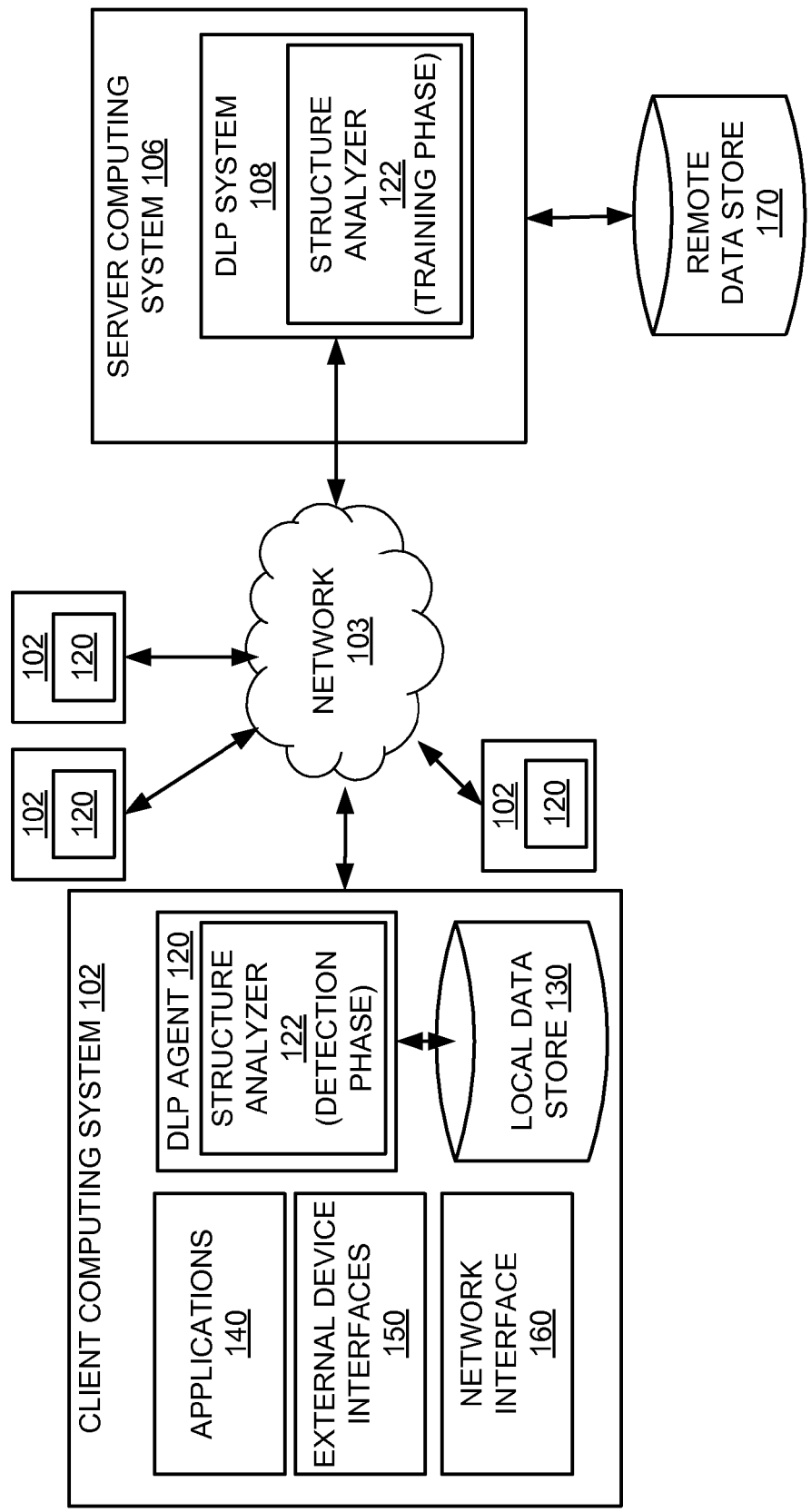
FIG. 1 is a block diagram of exemplary network architecture in which embodiments of a structure analyzer may operate.

FIG. 1 is a block diagram of an exemplary network architecture 100 in which embodiments of a structure analyzer 122 may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. In the depicted embodiment, the server computing system 106 may host a DLP system 108, which may include another instance of the structure analyzer 122. Alternatively, the functionality of the structure analyzer 122 can be distributed over the two machines. In the depicted embodiment, the structure analyzer 122 may be part of the DLP system 108. In other embodiments, the server computing system 106 may host one of the DLP system 108 and the structure analyzer 122 and another server computing system (not illustrated) may host the other one. Alternatively, other configurations are possible as would be appreciated by one of ordinary skill in the art having the benefit of this disclosure. In one embodiment, the client computing systems 102 and the server computing systems 106 may be part of an organization, such as a corporate enterprise. Alternatively, the server computing system 106 and the computing systems 102 may be part of different organizations.

The DLP system 108 may communicate with multiple DLP agents 120. Although the embodiments may be used in a DLP system using the DLP agents 120, the embodiments may also be used in other DLP products as would be appreciated by one of ordinary skill in the art having the benefit of this disclosure. For example, in one embodiment, the structure analyzer 122 is run on the client computing system 102. In another embodiment, the structure analyzer 122 is run on the server computing system 106. Alternatively, some of the functionality of the structure analyzer 122 is performed on the client computing system 102, while other functionality of the structure analyzer 122 is performed on the server computing system 106. It should also be noted that the structure analyzer 122 can be implemented in other configurations, such as within the DLP system 108. Also, the embodiments described herein may be used in other applications that can be used for performing structure analyzer operations as would be appreciated by one of ordinary skill in the art having the benefit of this disclosure.

In one embodiment, the DLP agent 120 monitors outbound data transfers by the client computing system 102. As part of monitoring and detecting violations, the DLP agent 120 may perform various methods of detecting violations of the DLP policy, such as those described above 1) described content matching (e.g. regular expressions, keyword dictionaries); 2) fingerprinting; and 3) machine-learning based content classification. In addition, the DLP agent 120 may utilize the structure analyzer 122 to identify information that should be protected, but that are not specifically identified in the DLP policy or without a priori knowledge of the information. This allows the DLP agent 120 to protect information that has not been added to DLP policies yet or information that is not specifically identified as being protected by the DLP policies. Operations of the structure analyzer 122 are described below with respect to FIGS. 2-3.

The DLP system 108 may communicate with the DLP agents 120 on the client computing systems 102 to perform operations to enforce a DLP policy as described herein. The DLP agent 120 is configured to detect a violation of a DLP policy in the outbound data transfers. If the DLP agent 120 detects the violation, the DLP agent 120 may prevent the data transfer and may report the violation to the DLP system 108. For example, the DLP agent 120 may create an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the structure analyzer 122 as part of enforcing the DLP policies.

Although only one server computing system 106 is illustrated in FIG. 1, the DLP system 108 may be hosted on one or more machines, including one or more server computers, client computers, gateways, network switches & routers or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes the DLP agent 120 that communicates with the DLP system 108. The client computing system 102 may include applications 140, external device interfaces 150, and network interfaces 160 that can be monitored by the DLP agent 120 as would be appreciated by one of ordinary skill in the art having the benefit of this disclosure. Alternatively, the DLP agent 120 can monitor other aspects of the client computing system 102 to monitor outbound data transfers. The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

In one embodiment, the structure analyzer 122 has two phases: (1) Training phase; and (2) Detection phase. In one embodiment, the training phase is implemented in the structure analyzer 122 on the server computing system 106, as part of the DLP system 108, and the detection phase is implemented in the structure analyzer 122 on the client computing system 102. In other embodiments, these phases may be performed both on the server computing system 106. In another embodiment, the training phase can be performed on the client computing system as would be appreciated by one of ordinary skill in the art having the benefit of this disclosure. Alternatively, other configurations are possible as would be appreciated by one of ordinary skill in the art having the benefit of this disclosure. The following description assumes that the DLP system 108 handles the training phase and the DLP agent handles the detection phase.

(1) Training Phase:

In this training phase, the DLP administrator may provide information to the DLP system 108 so that the DLP system 108 can define the structure (e.g., document templates or forms) upon which sensitive documents are based. Document templates are preformatted file types, such as a MS Word template, which is designated with a .dot file extension. The administrator can provide this information in multiple ways, including these three ways: (a) Template files (such as Microsoft Word Template .dot files) are directly provided to the DLP system; (b) Blank forms (such as Income Tax returns forms) are directly provided to the DLP system; and (c) A set of sensitive documents which are based on a common structure, template or form is provided to the DLP system. This information can be received at the DLP system 108 via a user interface, such as a graphical user interface, a command line interface, or other interfaces provided by the DLP system 108. Once this input has been provided to the DLP system 108, the structure analyzer 122 proceeds to extract structure, template or form information from these inputs. The structure analyzer 122 may extract this information using various methods, including at least the three methods described below. In other embodiments, other methods may be used as would be appreciated by one of ordinary skill in the art having the benefit of this disclosure.

Method M-(1)-(a): This method applies to document templates such as MS-Word .dot template, MS-Excel .xlt template and MS-PowerPoint .pot template files that are directly provided to the DLP system 108. The method described herein is not limited to Microsoft Office templates even though they have been cited herein as examples and can be easily applied to other document formats such as OpenOffice and PDF. In this embodiment, the structure analyzer 122 performs the following: (1) Extract properties of the template such as name, author, organization, language, etc; and (2) Extract building blocks of the template (such as table of contents, tables, heading 1 elements, pictures, embedded objects, etc). This extracted information may be used to define the structure definition for the provided template. For Microsoft Office templates, this data can be extracted using the Microsoft Office Object Model API. Similar methods exist for other document formats such as OpenOffice and PDF.

Method M-(1)-(b): This method applies to blank forms (such as regulatory forms), wiki template pages, and other documents that contain only the structural elements of the final document and are otherwise 'empty'. In this embodiment, the structure analyzer 122 performs the following: (1) Extract contents of the document (such as formatted text elements, tables, pictures, embedded objects, etc); (2) Create a list of the extracted content, maintaining the order in which they appear in the document. For example this list could look like [t1, t2, p1, t3, t4, T1, t5, p2, o1, t6] where t1, t2, etc represent formatted text elements; p1, p2, etc represent pictures and other graphical elements such as charts or diagrams; T1, T2, etc represent tables; o1, o2, etc represent embedded objects and so on; and (3) Define the structure of the provided form or template document using the created list. The method may be slightly different for spreadsheets (such as Microsoft Excel documents). In this case, a 2-D array may be extracted which represents content present in the cells. The rest of the method may remain the same, but performed on a two-dimensional array, instead of a list.

Method M-(1)-(c): This method applies to the case where the DLP administrator provides a set of sensitive documents which are based on a common structure, template or form to the DLP system 108. The structure analyzer 122 trains itself by comparing these documents against each other and extracting out structural information from them. In this embodiment, the structure analyzer 122 performs the following: (1) Extract contents of the document (such as formatted text elements, tables, pictures, embedded objects, etc); (2) Create a list of the extracted content, maintaining the order in which they appear in the document. For example this list could look like [t1, t2, p1, t3, t4, T1, t5, p2, o1, t6] where t1, t2, etc represent formatted text elements; p1, p2, etc represent pictures and other graphical elements such as charts or diagrams; T1, T2, etc represent tables; o1, o2, etc represent embedded objects and so on; (3) Create this list for all documents in the training set; and (4) Perform a n-way diff operation (difference operation) between these lists. After this operation, the structure analyzer 122 ends up with those parts that are common to all documents of the training set, and the structure analyzer 122 defines the structure of the training document set using the common parts. For example, this structure may look like [t1, xx, p1, t3, xx, T1, xx, xx, o1, t6] where t1, p1, etc define the structure of the training document set and xx represent placeholders for the parts that keep changing from document to document in the training set. The method may be slightly different for spreadsheets (such as Microsoft Excel documents). In this case, a 2-D array is extracted which represents content present in the cells. The rest of the method may remain the same, but performed on a two-dimensional array, instead of a list.

(2) Detection Phase:

In the detection phase, the DLP agent 120 (or DLP system 108) monitors outbound data transfers and encounters information (e.g., information in a document), which needs to be analyzed to see if it has the same structure as the structure defined during the training phase, as described above. Depending upon which method M-(1)-(a), M-(1)-(b) or M-(1)-(c) was used to define the structure, there corresponding methods can be used to analyze documents in the detection phase. In other embodiments, where different methods are used for the training phase, the detection phase may be adapted accordingly.

Method M-(2)-(a): This method applies to detection of documents that match structures defined using method M-(1)-(a). In this embodiment, the structure analyzer 122 performs the following: (1) Extract the underlying template of the document (using the MS-Office Object Model API, for example); (2) Extract properties of the template such as name, author, organization, language; (3) Extract building blocks of the template (such as table of contents, tables, heading 1 elements, pictures, embedded objects, etc); (4) Compare this extracted information with the structure extracted using method M-(1)-(a). If these two match with each other, the structure analyzer 122 concludes that this document's structure has matched with the structure identified in the training phase; and (5) The DLP agent 120 (or DLP system 108) then applies its policies on this document that either allow the document to be sent out or block it from being sent. The method may be slightly different for spreadsheets (such as Microsoft Excel documents). In this case, a 2-D array is extracted which represents content present in the cells. This 2-D array is compared to the 2-D array created in the training phase in place of the lists as described above. The rest of the method may remain the same, but performed on a two-dimensional array, instead of a list. It should be noted that the document structures need not match 100% for the structure analyzer 122 to conclude that the document is sensitive. Depending upon the fuzziness desired, less than 100% match may also be used to conclude that the document is sensitive. This parameter (the match percentage) may be adjusted by the DLP administrator if desired.

Method M-(2)-(b): This method applies to detection of documents that match structures defined using method M-(1)-(b). In this embodiment, the structure analyzer 122 performs the following: (1) Extract contents of the document (such as formatted text elements, tables, pictures, embedded objects, etc); (2) Create a list of the extracted content, maintaining the order in which they appear in the document. For example this list could look like [t1, t2, p1, t3, t4, T1, t5, p2, o1, t6] where t1, t2, etc represent formatted text elements; p1, p2, etc represent pictures and other graphical elements such as charts or diagrams; T1, T2, etc represent tables; o1, o2, etc represent embedded objects and so on; (3) Perform a diff operation between this list and the list that was generated using method M-(1)-(b). From this diff operation, the structure analyzer 122 retains items that are common to both lists and may discard the rest of the items. This operation results in a new list containing items that are common to both lists; and (4) Compare the list created in step (2) with the list created in step (3). If these two lists match with each other then the structure analyzer 122 may conclude that this document's structure has matched the structure identified in the training phases. The DLP agent 120 (or DLP system 108) then applies its policies on this document that either allow the document to be sent out or block it from being sent. The method maybe slightly different for spreadsheets (such as Microsoft Excel documents). In this case, a 2-D array is extracted which represents content present in the cells. This 2-D array is compared to the 2-D array created in the training phase in place of the lists as described above. The rest of the method may remain the same, but performed on a two-dimensional array, instead of a list. It should be noted that the document structures need not match 100% for the structure analyzer 122 to conclude that the document is sensitive. Depending upon the fuzziness desired, less than 100% match may also be used to conclude that the document is sensitive. This parameter (the percentage) may be adjusted by the DLP administrator if desired.

Method M-(2)-(c): This method applies to detection of documents that match structures defined using method M-(1)-(c). In this embodiment, the structure analyzer 122 performs the following: (1) Extract contents of the document (such as formatted text elements, tables, pictures, embedded objects, etc); (2) Create a list of the extracted content, maintaining the order in which they appear in the document. For example this list could look like [t1, t2, p1, t3, t4, T1, t5, p2, o1, t6] where t1, t2, etc represent formatted text elements; p1, p2, etc represent pictures and other graphical elements such as charts or diagrams; T1, T2, etc represent tables; o1, o2, etc represent embedded objects and so on; (3) Perform a diff operation between this list and the list that was generated using method M-(1)-(c). While performing this diff operation ignore items that correspond to placeholders (xx) in the list generated in M-(1)-(c); (4) Compare rest of the items and see if they match; (5) Determine the percent of the structure that was matched using the number of matches from the above comparison. The method may be slightly different for spreadsheets (such as Microsoft Excel documents). In this case, a 2-D array is extracted which represents content present in the cells. This 2-D array is compared to the 2-D array created in the training phase in place of the lists as described above. The rest of the method may remain the same, but performed on a two-dimensional array, instead of a list. It should be noted that the document structures need not match 100% for the structure analyzer 122 to conclude that the document is sensitive. Depending upon the fuzziness desired, less than 100% match may also be used to conclude that the document is sensitive. This parameter (the percentage) may be adjusted by the DLP administrator if desired.

Figure 2:
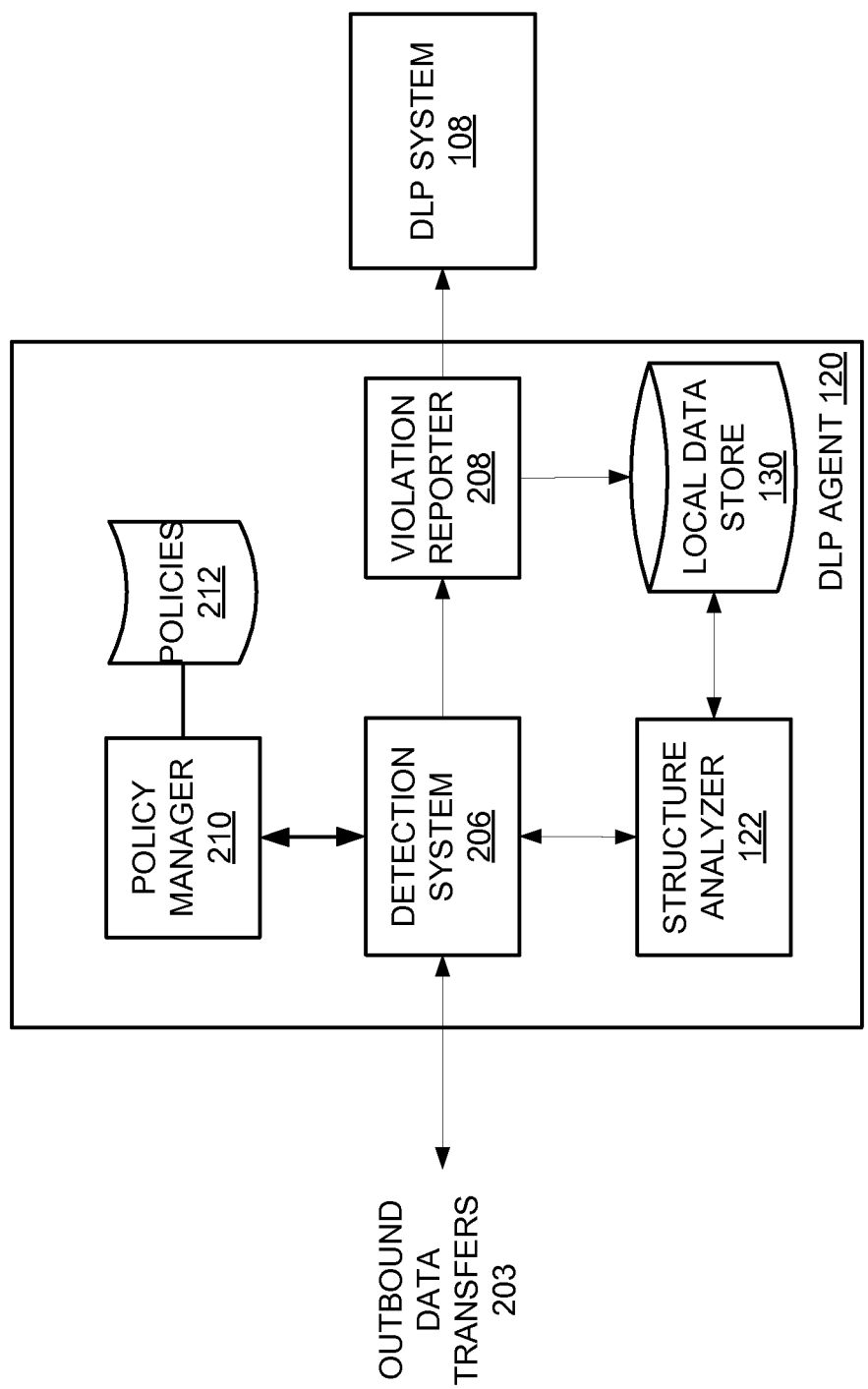
FIG. 2 is a block diagram of one embodiment of a DLP agent, including a classification engine, the structure analyzer, and a detection system to detect violations of a DLP policy.

FIG. 2 is a block diagram of one embodiment of a DLP agent 120, including a classification engine 202, the structure analyzer 122, and a detection system 206 to detect violations of a DLP policy. The DLP agent 120 also includes a violation reporter 208, a policy manager 210, and a policy data store 212. In the depicted embodiment, the classification engine 202 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The detection system 206 is configured to determine whether the data transfers 203 violate a DLP policy. The detection system 206 may use any one or more of the three methods to detect sensitive information as described above, such as 1) described content matching (e.g. regular expressions, keyword dictionaries); 2) fingerprinting; and 3) machine-learning based content classification. However, there may instances where the information to be protected is not known exactly, or cannot be described exactly using regular expressions and/or keyword dictionaries. For example, there may be instances where there is new information which is sensitive but is not known to the DLP system a-priori. For the example given above, the software development firm new design documents are created frequently, and most of the time the content to be protected is completely new to the DLP system 108, which then is not able to identify the protected content. In one embodiment, the detection system 206 is configured to use the structure analyzer 122 to determine whether the outbound data transfer 203 includes information that should be protected by the DLP policies, but may not be specifically identified by the DLP policies, as described herein.

In these embodiments, the detection system 206 may receive an outbound data transfer 203. The detection system 206 may send the information to the structure analyzer 122 to analyze the structure of the information. Using the structure of this information, the structure analyzer 122 can determine whether the structure of the outbound data transfer 203 matches a structure upon which a set of one or more protected documents are based. The structure may include structural information used by the DLP agent 120 to identify similar protected documents that are not specifically identified in the DLP policy. The structure analyzer 122 can identify the information as protected information to be protected by the DLP policy, even when the information is not specifically identified in the DLP policy. The structure analyzer 122 may any one or more of the embodiments described above with respect to the detection phase of the structure analyzer 122 to determine whether the information would violate the DLP policy.

The detection system 206 is used to detect the DLP policies and may perform some remedial or notification operation to help enforce the DLP policies. In some embodiments, when the detection system 206 considers the data transfer as insecure (e.g., detects a violation of the DLP policy), the detection system 206 can pause the data transfer and alert a user or an administrator. For example, the detection system 206 can generate an alert for a user to approve or deny the data transfer. Similarly, the alert can be provided to an administrator to approve or deny the data transfer.

In one embodiment, when the detection system 206 detects the violation, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., the DLP system 108). The information sent to the DLP service provider may identify, for example, the DLP policy being violated, the type of data being transferred, the destination entity specified to receive the data transfer, or other information concerning the violation, an identifier of the user or the client computing system 102 that caused the violation, as well as other information that may be helpful in remedying or recording the incidents.

The policy manager 210 defines DLP policies and stores them in the policy data store 212. The policy may also be used to monitor and detect for other types of DLP violations. For example, the policy may also specify sensitive data that should trigger a DLP policy if detected in the outbound data transfers 203. The policy manager 210 may create DLP policies based on user input, such as from the user of the client computing system 102 or an administrator of an organization providing the client computing system 102. Alternatively, the policy manager 210 may receive DLP policies from a DLP service provider (e.g., the DLP system 108) and store them in the policy data store 212.

The DLP system 108 is configured to receive the incident record of the violation from the violation reporter 208, and may be configured to perform some remedial or reporting operation as would be appreciated by one of ordinary skill in the art having the benefit of this disclosure.

It should be noted that the DLP system 108 may include other components for monitoring outbound data transfers 203 and detecting violations of the DLP policy, as well as other types of policies. Details regarding these other components have not been included so as to not obscure the description of the present embodiments.

Figure 3:
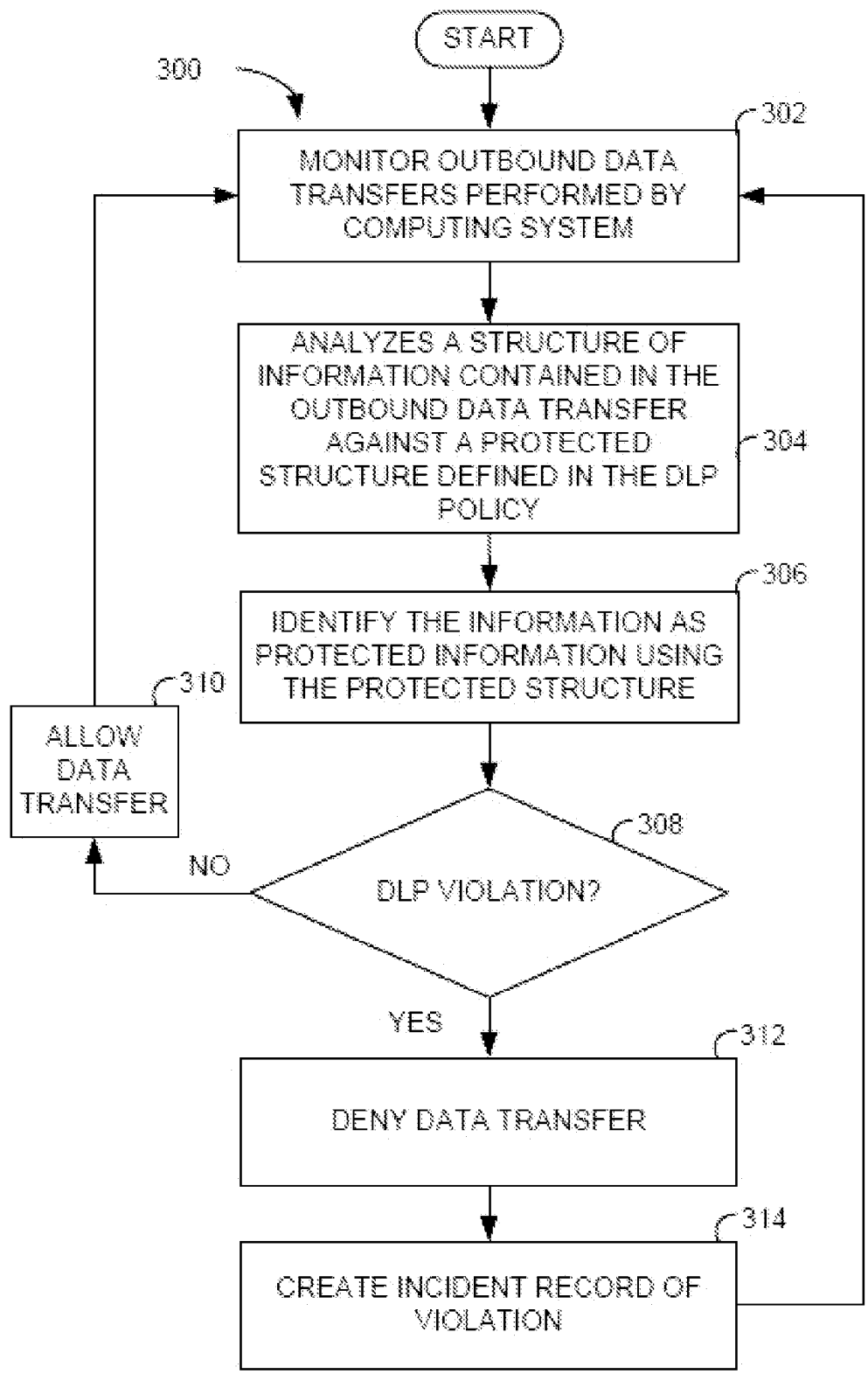
FIG. 3 is a flow diagram of one embodiment of a method of performing structure analysis for DLP.

FIG. 3 is a flow diagram of one embodiment of a method 300 of performing structure analysis for DLP. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In one embodiment, the server computing system 106 of FIG. 1 performs the method 300. In another embodiment, the structure analyzer 122 of FIGS. 1 and 2 performs the method 300. Alternatively, other components of the client computing system 102, the server computing system 106, or of both can be configured to perform some or all of the method 300.

Referring to FIG. 3, processing logic begins method 300 by monitoring outbound data transfers performed by the computing system (block 302). In one embodiment, the processing logic monitors outbound network traffic. Alternatively, the processing logic monitors other outbound data transfers, such as data transfers to a USB drive, FTP file transfers, printing activities, or the like. While monitoring in block 302, processing logic analyzes a structure of information contained in an outbound data transfer against a protected structure defined in a DLP policy (block 304). The processing logic identifies the information as protected information using the protected structure based on the analysis of the structure (block 306). When the information is identified as protected, the processing logic detects violations of the DLP policy (block 308). If the processing logic does not detect a policy violation at block 308, the processing logic allows the data transfer (block 310), and returns to monitoring at block 302. If the processing logic detects a DLP violation at block 308, the processing logic may deny the data transfer (block 312), and create an incident record of the violation (block 314). In other embodiments, instead of denying the data transfer, the processing logic may perform other operations as specified by the policy, such as notifying a system administrator, prompting the user to deny or allow the data transfer, and the like.

In one embodiment, the processing logic defines the protected structure using a document template. In another embodiment, the processing logic defines the protected structure using a document form. Alternatively, the processing logic defines the protected structure using a preformatted file type. In another embodiment, the processing logic performs a training phase to define the protected structure.

In one embodiment of the training phase, the processing logic receives input that identifies a template file. The processing logic extracts first structural information from the template file, and defines the protected structure based on the first structural information from the template file. In another embodiment, the processing logic extracts one or more properties from the template file and one or more building blocks from the template file. In yet a further embodiment, processing logic, which may reside on a different machine or on the same machine as the processing logic that performs the training phase, performs a detection phase to identify the information contained in the outbound data transfer as protected information. In one embodiment of the detection phase, the processing logic extracts second structural information from the information contained in the outbound data transfer, and compares the second structural information against the protected structure defined in the training phase.

In another embodiment of the training phase, the processing logic receives input that identifies a blank form. The processing logic extracts first structural information from the blank form, and defines the protected structure based on the first structural information from the blank form. In one embodiment, the processing logic extracts multiple structural elements from the blank form and creates a list of multiple structural elements. The structural elements may be formatted text elements, graphical elements, tables, embedded objects, or the like. In yet a further embodiment, processing logic (on same or different machine) performs a detection phase that extracts second structural information from the information contained in the outbound data transfer, and compares the second structural information against the protected structure defined in the training phase.

In one embodiment, the blank form is a spreadsheet, and the processing logic extracts multiple structural elements from multiple cells of the spreadsheet. The processing logic creates a 2D array to define the protected structure. During the detection phase, the processing logic extracts second structural information from the information contained in the outbound data transfer, and compares the second structural information against the 2D array defined in the training phase. In another embodiment, the blank form is an Income Tax return form, or wiki template pages, and other documents that contain only the structural elements of the final document and are otherwise 'empty'. Alternatively, the blank forms may be other types of documents as would be appreciated by one of ordinary skill in the art having the benefit of this disclosure.

In another embodiment of the training phase, the processing logic receives input that identifies a set of training documents which are based on a common structure. The processing logic extracts second structural information from the set of training documents, and defines the protected structure information based on the second structural information from the set of training documents. In one embodiment, for each of the training documents, the processing logic extracts multiple structural elements (e.g., formatted text elements, graphical elements, tables, embedded objects, or the like), creates a list from the plurality of structural elements for each of the set of training documents, and determines common structure elements from the created lists for the second structural information. In one embodiment, an n-way difference operation may be performed to determine the common structure elements. Alternatively, other operations may be used to determine the common structure elements as would be appreciated by one of ordinary skill in the art having the benefit of this disclosure. The processing logic uses the common structure elements to define the protected structure. In yet a further embodiment, processing logic (on same or different machine) performs a detection phase that extracts second structural information from the information contained in the outbound data transfer, and compares the second structural information against the protected structure defined in the training phase.

In one embodiment, the set of training documents are spreadsheets, and the processing logic extracts multiple structural elements from multiple cells of the spreadsheet. The processing logic creates a 2D array to define the protected structure. During the detection phase, the processing logic extracts second structural information from the information also contained in the outbound data transfer, and compares the second structural information against the 2D array defined in the training phase. Alternatively, the training documents may be other types of documents as would be appreciated by one of ordinary skill in the art having the benefit of this disclosure.

In other embodiments, the processing logic can perform the operations of the methods described above with respect to the training and detection phase of the structure analyzer 122 described above with respect to FIGS. 1-2.

Figure 4:
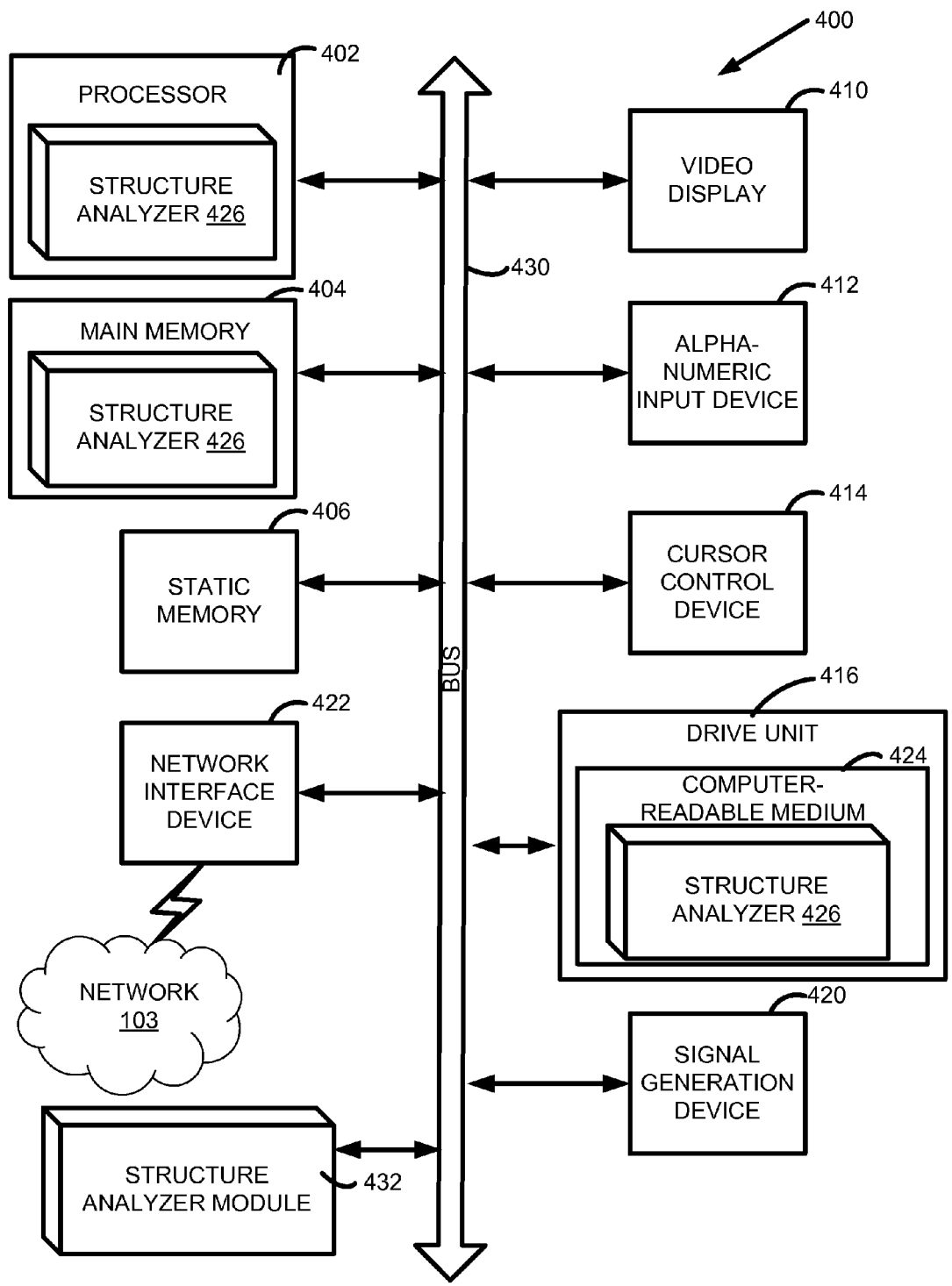
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for structure analyzer 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., structure analyzer 426) embodying any one or more of the methodologies or functions described herein. The structure analyzer 426 may also reside, completely or at least partially, within the main memory 404 and/or within the processor 402 during execution thereof by the computing system 400, the main memory 404, and the processor 402 also constituting computer-readable media. The structure analyzer 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The structure analyzer module 432, components, and other features described herein (for example in relation to FIGS. 1-2) can be implemented as discrete hardware components or integrated in the functionality of hardware components such as ASICS, FPGAs, DSPs, or similar devices. The structure analyzer module 432 may implement operations of structure analyzer as described herein with respect to FIG. 3. In addition, the structure analyzer module 432 can be implemented as firmware or functional circuitry within hardware devices. Further, the structure analyzer module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   comparing, by a processing device in a data loss prevention (DLP) system, a structure of information in an outbound data transfer performed by a computing system to protected structures in a DLP policy, wherein the protected structures are defined based on first structural information extracted from a training document stored in a memory, wherein the training document comprises a plurality of structural elements and is empty other than the plurality of structural elements;
   identifying the information in the outbound data transfer as protected based on comparing the structure to the protected structures; and
   determining that the outbound data transfer violates the DLP policy in response to identifying the information as protected.

2. The method of claim 1, further comprising:
   receiving input that identifies the training document;
   extracting the first structural information from the training document; and
   defining the protected structures based on the first structural information extracted from the training document.

3. The method of claim 2, wherein extracting the first structural information comprises extracting the plurality of structural elements from the training document, wherein the plurality of structural elements comprises one or more of a formatted text element, a graphical element, a table, or an embedded object, and wherein defining the protected structures comprises creating a list of the plurality of structural elements.

4. The method of claim 2, wherein the training document comprises a spreadsheet, wherein extracting the first structural information comprises extracting the plurality of structural elements from a plurality of cells of the spreadsheet, wherein defining the protected structures comprises creating a two-dimensional (2D) array, and wherein comparing the structure to the protected structures comprises comparing the structure to the 2D array.

5. The method of claim 1, further comprising:
   receiving input that identifies a set of training documents which are based on a common structure, wherein the set of training documents comprises the training document;
   extracting the first structural information from the set of training documents; and
   defining the protected structures based on the first structural information extracted from the set of training documents.

6. The method of claim 5, wherein extracting the first structural information comprises extracting the plurality of structural elements from the set of training documents, wherein the plurality of structural elements comprises one or more of a formatted text element, a graphical element, a table, or an embedded object, and wherein defining the protected structures comprises:
   creating a list of the plurality of structural elements;
   determining elements of the common structure from the list of the plurality of structural elements; and
   defining the protected structures using the elements of the common structure.

7. The method of claim 5, wherein the set of training documents comprises spreadsheets, wherein extracting the first structural information comprises extracting the plurality of structural elements from a plurality of cells of the spreadsheets, wherein defining the protected structures comprises creating a two-dimensional (2D) array, and wherein comparing the structure to the protected structures comprises comparing the structure to the 2D array.

8. A system comprising:
a memory; and
a processing device to communicate with the memory and to execute a data loss prevention (DLP) system, the processing device to:
compare a structure of information in an outbound data transfer performed by a computing system to protected structures in a DLP policy, wherein the protected structures are defined based on first structural information extracted from a training document stored in the memory, wherein the training document comprises a plurality of structural elements and is empty other than the plurality of structural elements;
identify the information in the outbound data transfer as protected based on the comparison of the structure to the protected structures; and
determine that the outbound data transfer violates the DLP policy in response to the identification of the information in the outbound transfer as protected.

9. The system of claim 8, wherein the processing device is further to:
receive input that identifies the training document;
extract the first structural information from the training document; and
define the protected structures based on the first structural information extracted from the training document.

10. The system of claim 9, wherein the processing device is to extract the first structural information by extracting the plurality of structural elements from the training document, wherein the plurality of structural elements comprises one or more of a formatted text element, a graphical element, a table, or an embedded object, and wherein the processing device is to define the protected structures by creating a list of the plurality of structural elements.

11. The system of claim 9, wherein the training document comprises a spreadsheet, wherein the processing device is to extract the first structural information by extracting the plurality of structural elements from a plurality of cells of the spreadsheet, wherein the processing device is to define the protected structures by creating a two-dimensional (2D) array, and wherein the processing device is to compare the structure to the protected structures by comparing the structure to the 2D array.

12. The system of claim 8, wherein the processing device is further to:
receive input that identifies a set of training documents which are based on a common structure, wherein the set of training documents comprises the training document;
extract the first structural information from the set of training documents; and
define the protected structures based on the first structural information extracted from the set of training documents.

13. The system of claim 12, wherein the processing device is to extract the first structural information by extracting the plurality of structural elements from the set of training documents, wherein the plurality of structural elements comprises one or more of a formatted text element, a graphical element, a table, or an embedded object, and wherein the processing device is to define the protected structures by:
creating a list of the plurality of structural elements;
determining elements of the common structure from the list of the plurality of structural elements; and
defining the protected structures using the elements of the common structure.

14. The system of claim 12, wherein the set of training documents comprises spreadsheets, wherein the processing device is to extract the first structural information by extracting the plurality of structural elements from a plurality of cells of the spreadsheets, wherein the processing device is to define the protected structures by creating a two-dimensional (2D) array, and wherein the processing device is to compare the structure to the protected structures by comparing the structure to the 2D array.

15. A non-transitory computer readable storage medium including instructions that, when executed by a processing device, cause the processing device to perform operations comprising:
comparing, by the processing device in a data loss prevention (DLP) system, a structure of information in an outbound data transfer performed by a computing system to protected structures in a DLP policy, wherein the protected structures are defined based on first structural information extracted from a training document stored in a memory, wherein the training document comprises a plurality of structural elements and is empty other than the plurality of structural elements;
identifying the information in the outbound data transfer as protected based on comparing the structure to the protected structures; and
determining that the outbound data transfer violates the DLP policy in response to identifying the information as protected.

16. The non-transitory computer readable storage medium of claim 15, wherein the operations further comprise:
receiving input that identifies the training document;
extracting the first structural information from the training document; and
defining the protected structures based on the first structural information extracted from the training document.

17. The non-transitory computer readable storage medium of claim 16, wherein the training document comprises a spreadsheet, wherein extracting the first structural information comprises extracting the plurality of structural elements from a plurality of cells of the spreadsheet, wherein defining the protected structures comprises creating a two-dimensional (2D) array, and wherein comparing the structure to the protected structures comprises comparing the structure to the 2D array.

18. The non-transitory computer readable storage medium of claim 15, wherein the operations further comprise:
receiving input that identifies a set of training documents which are based on a common structure, wherein the set of training documents comprises the training document;
extracting the first structural information from the set of training documents; and
defining the protected structures based on the first structural information extracted from the set of training documents.

19. The non-transitory computer readable storage medium of claim 18, wherein extracting the first structural information comprises extracting the plurality of structural elements from the set of training documents, wherein the plurality of structural elements comprises one or more of a formatted text element, a graphical element, a table, or an embedded object, and wherein defining the protected structures comprises:
  creating a list of the plurality of structural elements;
  determining elements of the common structure from the list of the plurality of structural elements; and
  defining the protected structures using the elements of the common structure.

20. The non-transitory computer readable storage medium of claim 18, wherein the set of training documents comprises spreadsheets, wherein extracting the first structural information comprises extracting the plurality of structural elements from a plurality of cells of the spreadsheets, wherein defining the protected structures comprises creating a two-dimensional (2D) array, and wherein comparing the structure to the protected structures comprises comparing the structure to the 2D array.

* * * * *